United States Patent [19]

Alamprese et al.

[11] Patent Number: 4,547,079
[45] Date of Patent: Oct. 15, 1985

[54] AVERAGING TEMPERATURE RESPONSIVE APPARATUS

[75] Inventors: Leo Alamprese, Wood Dale; Lawrence E. Donahue, Arlington Heights, both of Ill.

[73] Assignee: Honeywell Inc., Minneapolis, Minn.

[21] Appl. No.: 596,494

[22] Filed: Apr. 4, 1984

[51] Int. Cl.⁴ .......................... G01K 3/02; G01K 1/16
[52] U.S. Cl. .................................. 374/116; 374/141; 374/138
[58] Field of Search ............... 374/115, 116, 147, 148, 374/138

[56] References Cited

U.S. PATENT DOCUMENTS

| | | | |
|---|---|---|---|
| 2,887,879 | 5/1959 | Vonnegut | 374/138 X |
| 2,971,997 | 2/1961 | Carrico | 374/138 X |
| 3,167,956 | 2/1965 | Grey | 374/148 X |
| 3,623,367 | 11/1971 | Benedict | 374/115 X |
| 3,631,687 | 1/1972 | Brooks et al. | 62/227 |
| 4,265,115 | 5/1981 | Stuhr | 374/116 |

FOREIGN PATENT DOCUMENTS 0734702 12/1953 United Kingdom ............... 374/144

Primary Examiner—Daniel M. Yasich
Attorney, Agent, or Firm—Trevor B. Joike

[57] ABSTRACT

An averaging temperature responsive device having a hollow elongated member, a plurality of holes substantially along the length of the member, the plurality of holes decreasing in area from the hole near the end at which the member is mounted to the hole at the other end of the member, an exhaust opening at the second end of the member for permitting air moving through the duct which enters the plurality of holes to be exhausted from the inside of the member, and a temperature responsive element for sensing the average temperature of air moving through the member.

5 Claims, 3 Drawing Figures

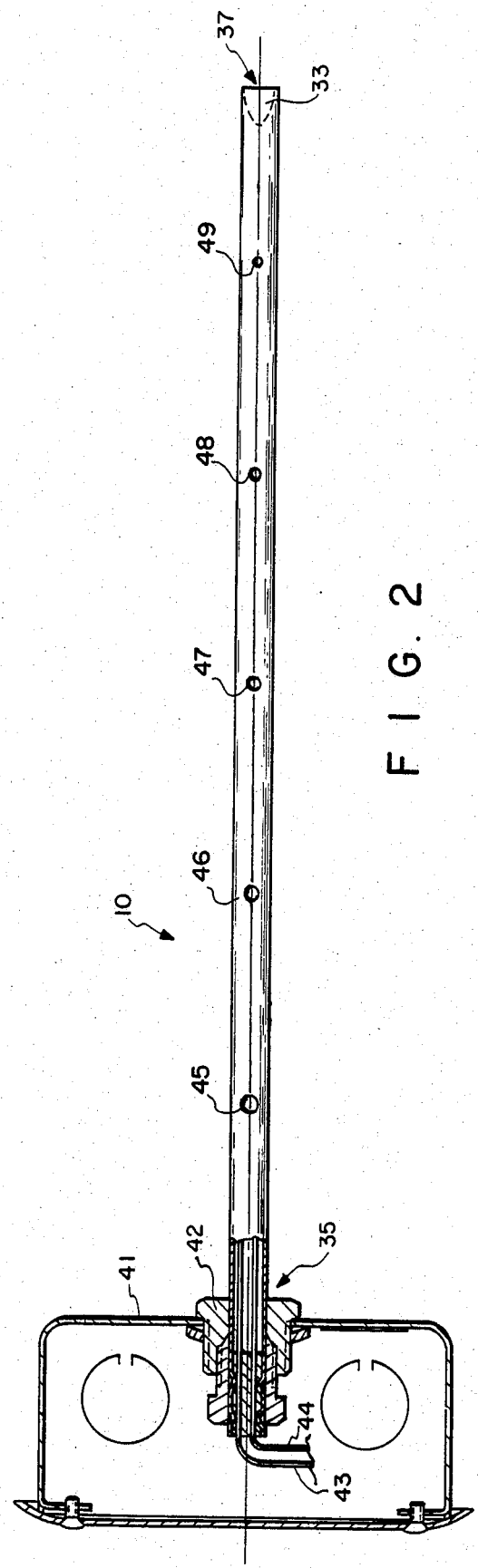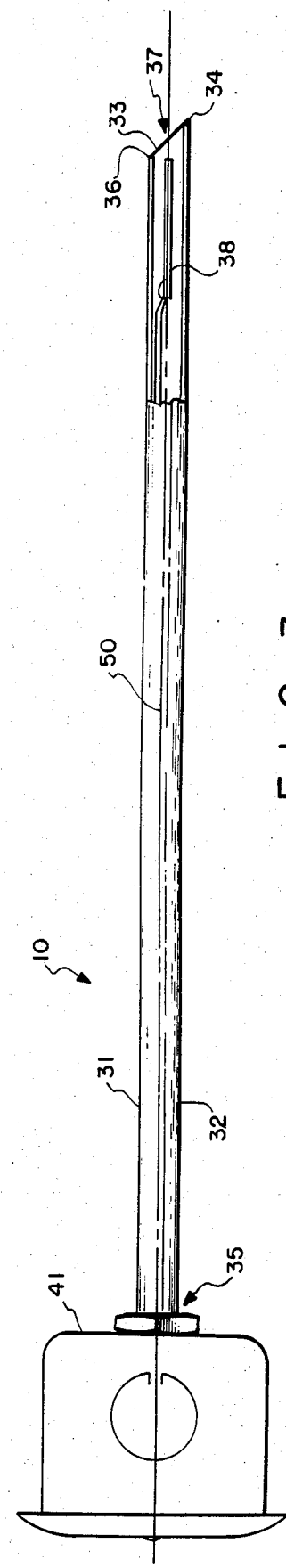

AVERAGING TEMPERATURE RESPONSIVE APPARATUS

BACKGROUND OF THE INVENTION

The present invention relates to an averaging temperature responsive device usable in an air duct for measuring the average temperature across the duct of air moving therethrough and, more particularly, to such an averaging temperature responsive device which can alternatively be used as a point sensor.

Sensing temperature of the air moving through air ducts has historically been an essential ingredient in air conditioning and heating systems within buildings. The prior art has typically employed a resistance type sensor such as a Balco resistance as a sensor for sensing the temperature of the air moving through the duct. Unfortunately, the temperature profile of the air across the width of the duct may not be a constant so that the sensing of the temperature at any specific point across the width of the duct may not yield the true temperature of the air moving through that duct.

In order to accurately sense the actual temperature of the air moving through an air duct in an air conditioning and/or heating system, the prior art developed averaging temperature sensors for sensing the average temperature across the duct of the air moving through the duct. These prior art sensors comprise a long hollow tube having holes along the length thereof for permitting air at various points across the duct to enter the tube and to flow along the length of a tube to a sensor. By the time the air reaches the sensor, it will have been mixed enough to insure that the sensor will sense the average temperature of the air entering the slots at the various points along the length of the tube.

The use of holes along the length of these prior art tubes, however, does not allow for optimized temperature averaging. Moreover, these prior art air averaging temperature responsive sensors cannot also be used as point sensors for those applications which require point sensing rather than averaging sensing.

SUMMARY OF THE INVENTION

The present invention increases the averaging capability of averaging temperature sensors by providing a hollow, elongated member having a plurality of holes substantially along the length of the member, the member being mounted inside the duct at one of its end and having an opening at its other end so that air entering the plurality of holes can be exhausted from the member, the holes decreasing in area from the hole nearest the one end of the member to the hole nearest the end of the member having the exhaust opening, the total area of the plurality of holes being less than the area of the exhaust opening, and a temperature responsive element located at the end having the exhaust opening for sensing the average temperature of the air moving through the member.

The exhaust opening can be configured so that by repositioning the member, the exhaust opening becomes the intake opening and the plurality of holes become the exhaust opening allowing the device to be used as a point sensor.

BRIEF DESCRIPTION OF THE DRAWINGS

These and other features and advantages will become more apparent from a detailed consideration of the invention when taken in conjunction with the drawings in which:

FIG. 2 shows a top view of the air averaging temperature sensor according to the present invention; and, FIG. 3 shows a side view of the averaging temperature responsive device according to the present invention.

DETAILED DESCRIPTION

Figure 1:
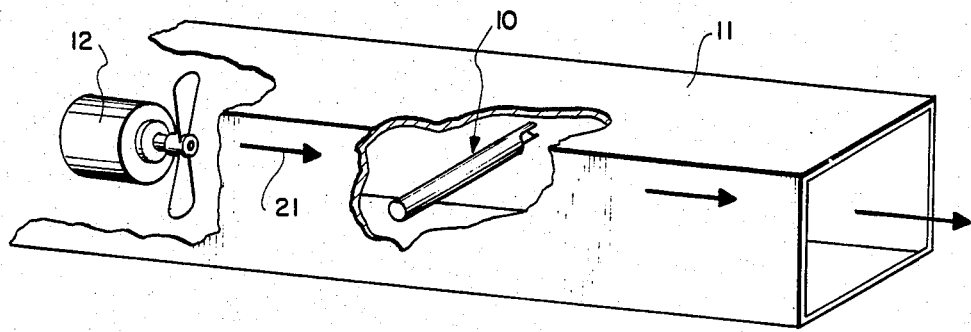
FIG. 1 shows an air averaging temperature sensor mounted within an air duct in an air conditioning and/or heating system.

As shown in FIG. 1, the averaging temperature responsive device 10 is mounted within air duct 11 in which is located a fan 12 for distributing air through duct 11 to the zones or rooms of a building. The direction of air flow through duct 11 is in the direction of arrows 21. The use of point sensors is typically not advantageous in air conditioning and/or heating systems since the temperature profile across duct 11 of the air moving through the duct is not constant. With such a nonconstant temperature profile, the measurement of temperature at any specific point across duct 11 may not yield the average temperature of the air moving through duct 11. Therefore, it is desirable to sense the temperature at a plurality of points across duct 11 so that the average temperature can be derived.

Rather than sense the temperature at a plurality of points across duct 11 and then use an algorithm for determining the average temperature for these plurality of points, it is more efficient and economical to use a device which mixes samples of air at various points across duct 11 so that the temperature of the mixed air can be sensed in one operation to directly produce a signal representative of the average temperature of air moving through duct 11.

Prior art averaging temperature responsive sensors have comprised a tube having a plurality of holes along the length thereof for sampling the air at various points across a duct. However, the prior art has paid little attention to the combined area of the holes in relation to air flow through the tube and, as a result, its ability to properly average the temperature across the duct. We have found that for proper draw through the holes, through the tube and out the exhaust opening the total area of the holes must be less than the area of the exhaust opening. Specifically, the holes should have a total area of 20% or less of the exhaust opening. The negative pressure created between the exhaust opening and the intake holes that will result from this construction will assure sufficient draw through the tube to produce an accurate average temperature at the sensor.

Accordingly, the averaging temperature responsive device 10 shown in FIGS. 2 and 3 includes a hollow, elongated member or tube 31 having a plurality of holes 45-49 along a substantial length of tube 31. Tube 31 may have any geometrically shaped cross section although a circular cross section is preferred. Holes 45-49, because they run along a substantial length of member or tube 31, allow air over a substantial cross section of the duct in which it is mounted to enter member 31 and flow along the length thereof before it exits at exhaust opening 33. Exhaust opening 33 is slanted so that its point 34 which is furthest away from first end 35 of tube 31 is substantially aligned with slot 32 and second point 36 which is nearer to first end 35 is on the other side of tube 31 away from slot 32.

Becase exhaust opening 33 is slanted, and because the total area of holes 45–49 is less than the area of exhaust opening 33, the negative pressure at second end 37 of tube 31 is increased which enhances the flow from duct 11 through slot 22, through tube 31, through exhaust opening 33, and back out into duct 11.

Temperature sensor 38 is located at second end 37 inside member 31 to sense the temperature of the air moving through member 31. Because holes 45–49 sample the air continuously across a substantial cross section of duct 11, temperature sensor 38 will sense the average temperature across duct 11.

Averaging temperature responsive device 10 is mounted to the duct at its second end 35. The standard gray electrical box 41 can serve this purpose. Member or tube 31 is attached to box 41 by suitable bushing 42 having means for allowing the wire connections 43 and 44 to sensor 31 to travel through the interior of tube 31, through bushing 42 and into electrical box 41.

Hole 45 furthest away from sensor 38 has the largest diameter, hole 46 has the next largest diameter and so on with hole 49 nearest sensor 38 having the smallest diameter. This configuration is designed to characterize member 31 to provide a true average of the air moving therethrough and sensed by temperature sensor 38. Because the air entering hole 45 has further to travel along member 31, and thus meets more resistance, a greater amount of air is permitted to enter hole 45. On the other hand, since the air entering hole 49 has lesser distance to travel, and accordingly meets lesser resistance, less air is permitted to enter hole 49. In this manner, the air which reaches temperature sensor 38 has a temperature which is truly an average of the air moving through duct 11.

Because exhaust opening 33 is slanted and because it is located at the second end of member 31 instead of the end nearer to the end at which device 10 is mounted to duct 11, member 31 has better air flow therethrough; the slant opening enhances the negative pressure created at end 37 and positioning the exhaust opening at the second end rather than the first end at which member 31 is mounted to the duct does not permit the flow through member 31 to be disrupted by the flow characteristics of the air moving through duct 11 at the duct surfaces.

Moreover, by repositioning temperature responsive device 10, i.e. by rotating it substantially 180° about its longitudinal axis 50, air moving through duct 11 is allowed to enter exhaust opening 31 and exit holes 45–49 so that temperature responsive device 10 can be used as a point sensor instead of an averaging sensor.

The embodiments of the invention in which an exclusive property or right is claimed are defined as follows:

1. An averaging temperature responsive device for use in sensing the average temperature of air passing through a duct comprising:
   a hollow, elongated member to be mounted inside a duct, said member having first and second ends and a length therebetween, said first end for supporting said member inside said duct;
   said member having a plurality of air intake holes substantially along the length thereof, said holes having areas of decreasing size from the hole near the first end of said member to a hole near the second end of said member, said plurality of air intake holes permitting air from said duct to enter said member;
   said member having an exhaust opening at said second end for permitting air moving through said duct which enters said plurality of air intake holes to be exhausted from inside said member, the total area of said holes being less than the area of said exhaust opening; and,
   a temperature responsive element for sensing the average temperature of air moving through said member, said temperature responsive element being located within said member at said second end so that it senses the temperature of the air moving through said member, said exhaust opening is slanted so that its point farthest from said end is substantially aigned with said tapered slot and its point nearer said first end is substantially 180° around said member from said farthest point whereby the flow characteristics are improved in the member.

2. The device of claim 1 wherein said total area of said plurality of holes is less than or equal to 20% of the area of said exhaust opening.

3. The device of claim 2 wherein said exhaust opening is slanted so that its point farthest from said first end is substantially aligned with said tapered slot and its point nearer said first end is substantially 180° around said member from said farthest point.

4. A temperature responsive device for alternatively sensing the average temperature of air passing through a duct or the temperature at a specified point in the air passing through the duct comprising:
   a hollow, elongated member to be mounted inside a duct, said member having first and second ends and a length therebetween, said first end for supporting said member inside said duct;
   said member having a plurality of holes substantially along the length thereof, said holes having areas of decreasing size from a hole near the first end of said member to a hole near the second end of said member, said plurality of holes permitting air to flow between said duct and inside said member;
   said member having a slanted opening at said second end to improve the flow characteristics in the member, said slanted opening having a point farthest from said first end substantially aligned with said plurality of holes and a point nearer said first end substantially 180° around said member from said farthest point, the total area of said holes being less than the area of the exhaust opening; and,
   a temperature responsive element located within said member at said second end for sensing either the average temperature of air moving through said member when said temperature responsive device is positioned in a manner to allow air to enter said plurality of holes and exit said slanted opening or for sensing a point temperature at a specified point in the air moving through said duct when said member is positioned within said duct so that air moving through said duct enters said slanted opening and exits said plurality of holes.

5. The device of claim 4 wherein said total area of said plurality of holes is less than or equal to 20% of the area of said exhaust opening.

* * * * *